F. G. BELKNAP.

Shoes and Dies for Grinding and Amalgamating Machines.

No. 5,943. Reissued June 30, 1874.

Witnesses

John L Boone

D. R. Cowl

Inventor

F. G. Belknap by Dewey & Co

Atty's

AM. PHOTO-LITHOGRAPHIC Co. N. Y. (OSBORNE'S PROCESS.)

UNITED STATES PATENT OFFICE.

FRANCILLO G. BELKNAP, OF WASHOE, NEVADA, (TO ISSUE TO CHARLES C. COOLIDGE, EXECUTOR OF ZENAS WHEELER, ASSIGNEE, DECEASED.)

IMPROVEMENT IN SHOES AND DIES FOR GRINDING AND AMALGAMATING MACHINES.

Specification forming part of Letters Patent No. 52,015, dated January 16, 1866; reissue No. 5,943, dated June 30, 1874; application filed June 1, 1874.

*To all whom it may concern:*

Be it known that I, F. G. BELKNAP, of Washoe, in the State of Nevada, have invented certain Improvements in Shoes and Dies for Grinding and Amalgamating Pans; and I hereby declare the following to be a full, clear, and exact description thereof, reference being had to the accompanying drawings.

My invention consists in a novel construction and arrangement of shoes and dies, having grooves or channels running obliquely from the circumference to the center, terminating in a line described by a radius to the center or axis. My invention also relates to beveled bars placed between each die, and partially filling the groove, for the purpose of keeping the ore near the same as they pass each other.

To enable others skilled in the art to make and use my improvements in shoes and dies, reference is had to the accompanying drawing, in which—

Figure 1:
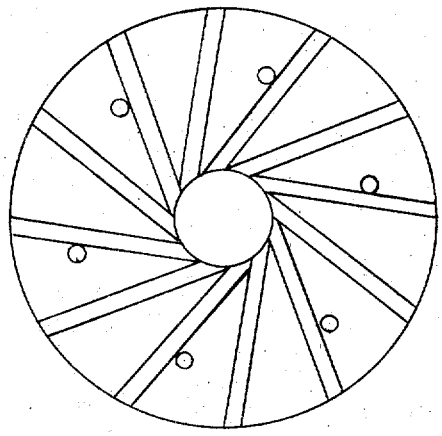
Figure 2:
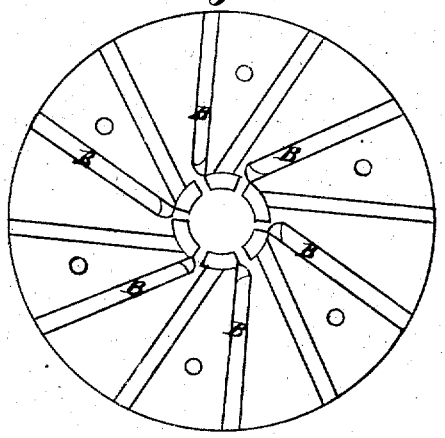
Figure 4:
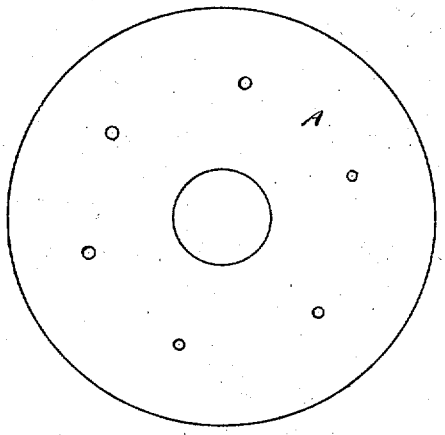
Figure 3:
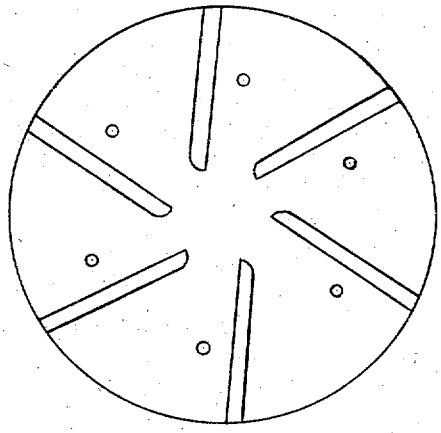
Figure 5:
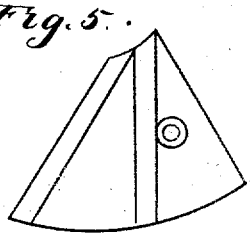
Figure 6:
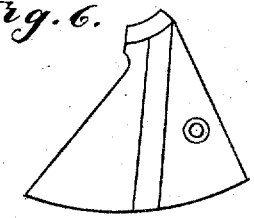
Figure 7:
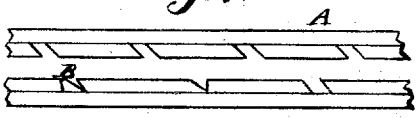

Figure 1 is a bottom plan of a complete muller. Fig. 2 is a bottom view of the pan, showing the dies in place. Fig. 3 is a bottom of pan with dies removed. Fig. 4 is a plan of muller without shoes. Fig. 5 is a plan of a shoe. Fig. 6 is a plan of a die. Fig. 7 is an edge view of muller and pan bottom with shoes and dies in place.

The muller A contains about twelve iron shoes or grinding surfaces with beveled edges, and running obliquely toward the center or axis, as shown at Figs. 1 and 5, and properly fastened to the muller-disk by recesses made for that purpose.

Grooves or channels are left between these shoes to cause a rapid flow of the pulp outward by the centrifugal force of the revolving muller, and the vacuum formed by the peculiar position and angle of the grooves.

The shoes may be made double when the number of holes or recesses on the muller-disks are less than the number of shoes, in which case a beveled groove would be made in the middle of each double shoe, as at Fig. 5.

The dies are similar in form to the shoes, and beveled and fastened to the pan in a similar manner, leaving a space or channel between the dies, that may be partially filled with a bar or wedge, B, forming a beveled channel upon its upper surfaces, if desired.

The bar B may be of wood and made sufficiently wide to contain the bevel, by making the die perpendicular on its front edge, as shown at Fig. 7, and held in place by its lower thin edge pressing against the lower rear edge of the preceeding die, thus firmly fastening both dies and bars.

When the muller is let down to its place and put in motion, the edges of the shoes and dies will meet and cut the pulp after the manner of a pair of scissors.

In order to insure a constant and rapid flow of pulp, with an even and constant supply of the coarser particles of ore to be drawn through the machine, and be operated upon by the grinding-surfaces, and forcing a rapid current of ore against the quicksilver for amalgamating, the grooves should run obliquely, throwing the pulp out in a rapid manner, causing a vacuum, when the atmospheric pressure will cause a flow to where the machine can exert its greatest influence, and a steady rotary motion of the ore from above to below the muller will be maintained as long as needed.

Other arrangements of shoes and dies have been constructed for grinding and amalgamating ores, passing each other at their outer ends or verge of the circle first, and as they passed around they closed in the middle, thus preventing the pulp from flowing freely under the mullers.

I am aware also of the patent to Hepbrun & Peterson, reissued November 19, 1864, which shows devices for passing the pulp out at the periphery; therefore, I do not claim this broadly.

Having thus described my invention, I do not claim broadly the use of shoes and dies for the purpose of reducing and amalgamating ores, for these are well known and used; but What I do claim, and desire to secure by Letters Patent, is—

1. The shoes and dies when secured to the upper and nether disks obliquely, at about the angle described, and provided with grooves, substantially as and for the purpose set forth.

2. The bars B B B, when beveled to form passages for the flow of pulp, in combination with the shoes and dies constructed to operate substantially as described, and for the purposes above set forth.

In witness whereof I hereunto set my hand and seal.

FRANCILLO G. BELKNAP. [L. S.]

Witnesses:

THOMAS PORTER,
W. W. TREAT.